United States Patent Office 3,390,380
Patented June 25, 1968

3,390,380

BINARY-INFORMATION ANALYSING ARRANGEMENTS

Edmund Harry Cooke-Yarborough, Murray Hill, N.J., and Ivor Noel Hooton, Cassington, Oxford, Stanley Alfred Hickman, West Compton, near Shepton Mallet, Somerset, and Gilbert Maurice Prior, Chewton Mendip, near Bath, Somerset, England, assignors to United Kingdom Atomic Energy Authority, London, England, and Electric & Musical Industries Ltd., Hayes, England Filed Aug. 18, 1965, Ser. No. 480,690
Claims priority, application Great Britain, Aug. 20, 1964, 34,181/64
15 Claims. (Cl. 340—172.5)

ABSTRACT OF THE DISCLOSURE

A binary-information analysing arrangement comprises a store having far fewer locations than the theoretically possible number of different incoming words but sufficient to accommodate a statistically significant fraction of said number, the storage locations being filled and characteristically labelled in sequence by the most frequently occurring words, any excess words being dumped or stored elsewhere. The storage locations each conveniently comprise a plurality of magnetic cores known as transfluxors, there being provided in one particular arrangement for each digit to be stored, means to enable the contents to be compared with an incoming signal in addition to the usual read and write requirements.

Figures 1, 2:
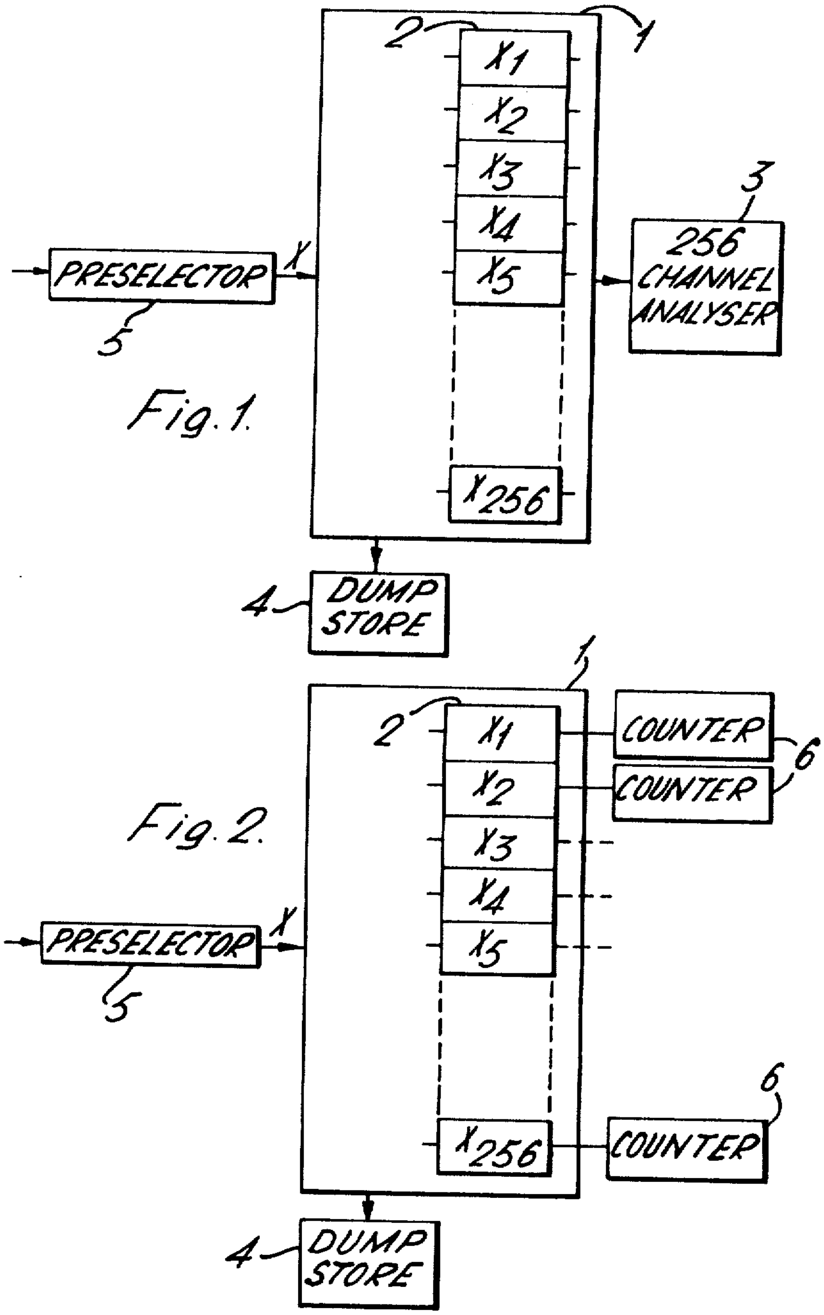

This invention relates to binary-information analysing arrangements.

In, for example, the field of nuclear physics, experiments are done in the course of which certain events may take place, and on the occurrence of such an event a binary digital word which is uniquely descriptive of that event is produced. Hereinafter such a word is referred to as a "channel descriptor." The number of possible channel descriptors is equal to the number of possible different events of interest, and each channel descriptor is formed by as many binary digits as are necessary to represent this number. Experiments currently projected call for $10^6$ possible channel descriptors, whilst experiments can be visualised which would call for $10^{12}$ channel descriptors.

The channel descriptors are supplied to a binary-information analysing arrangement which has conventionally been a multi-channel analyser. The mode of operation of such multichannel analysers involves a one-to-one relationship between the acceptable channel descriptors and the binary words (or addresses) defining the channels in the analyser. Thus to accept all possible channel descriptors the analyser must have as many channels as there are possible channel descriptors. Apart from the technical difficulties of building an analyser with say $10^6$ channels, the cost, in the present state of memory techniques, is likely to be prohibitive.

An object of the present invention is to provide an arrangement which may be used to analyse such binary information and which, whilst saving equipment and expense as compared with a multichannel analyser having as many channels as there are possible descriptors, can be arranged to be unlikely to neglect desired information.

According to the present invention, a binary-information analysing arrangement for analysing incoming binary digital words each formed by an equal plurality of binary digits comprises a binary store having a plurality of storage locations each able to store one incoming word, the number of storage locations being less than the total possible number of different incoming words, means to route incoming words to the storage locations such that incoming words identical with words already stored in a storage location are routed to that storage location and incoming words not identical with words already stored are routed to an unused storage location until all the storage locations are filled, and counter means associated with each storage location to register a count each time an incoming word is routed into that storage location.

According to a feature of the present invention, a binary-information analysing arrangement for analysing incoming binary digital words each formed by an equal plurality of binary digits comprises a binary store having a plurality of storage locations each able to store one incoming word, the number of storage locations being less than the total possible number of different incoming words, means to route incoming words to the storage locations such that incoming words identical with words already stored in a storage location are routed to that storage location and incoming words not identical with words already stored are routed to an unused storage location until all the storage locations are filled, and means associated with each storage location to supply an outgoing binary digital word identifying the storage location each time an incoming word is routed into that storage location.

Said arrangement may also comprise an accumulating store, for example a multichannel analyser, to which the outgoing words are supplied and which has as many channels as there are storage locations in the binary store.

According to another feature of the present invention, a binary-information analysing arrangement for analysing incoming binary digital words, each of which is formed by a plurality N of binary digits, comprises a binary store having a plurality of storage locations each able to store a plurality $n$ of binary digits where $n$ is less than N, means to route incoming words to the storage locations such that incoming words having the $n$ most significant binary digits identical with the $n$ binary digits stored in any storage location are routed to that storage location and incoming words not having the $n$ most significant binary digits identical with the $n$ binary digits stored in any storage location are routed to an unused storage location until all the storage locations are filled, and means associated with each storage location to supply an outgoing binary digital word each time an incoming word is routed into that storage location, each outgoing word comprising the $N-n$ least significant binary digits of the incoming word then being routed into that storage location.

Said arrangement may also comprise a plurality of multichannel analysers equal in number to the number of storage locations and connected one-to-one therewith such that each outgoing word is supplied to the multichannel analyser associated with the relevant storage location, each multichannel analyser having $2^{(N-n)}$ channels.

According to a further feature of the present invention, a binary-information analysing arrangement for analysing incoming binary digital words, each of which is formed by a plurality N of binary digits, comprises a binary store having a plurality S of storage locations each able to store a plurality $n$ of binary digits where $n$ is less than N but greater than $\log_2 S$, means to route incoming words to the storage locations such that incoming words having the $n$ most signficant binary digits indentical with the $n$ binary digits stored in any storage location are routed to that storage location and incoming words not having the $n$ most signficant binary digits identical with the $n$ binary digits stored in any storage location are routed to an unused storage location until all the storage locations are filled, and means associated with each storage location to supply an outgoing binary digital word each time an incoming word is routed into that storage location each outgoing word being formed by a plurality $\log_2 S$ of binary digits identifying the storage location plus the $N-n$ least significant binary digits of the incoming word then being routed into that storage location.

Preferably said arrangement also comprises a multichannel analyser to which the outgoing words are supplied and which has $2^{(N-n)}$ times as many channels as there are storage locations in the binary store.

Figures 3, 4:
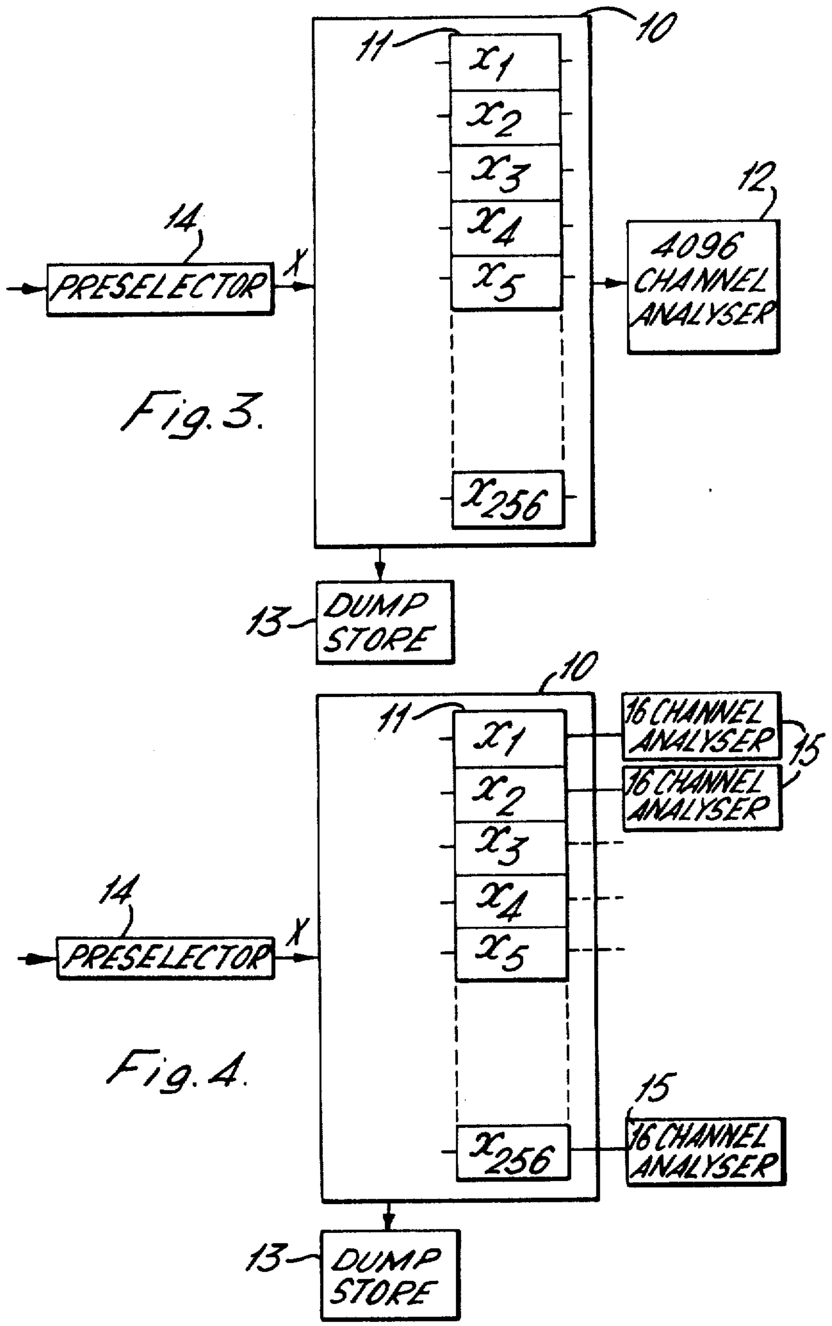
Figure 10:
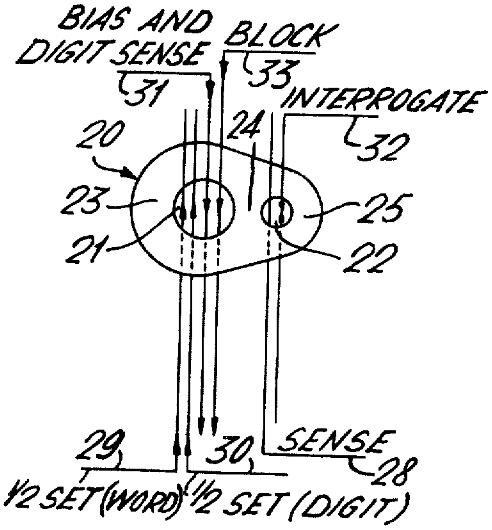
Figure 9:
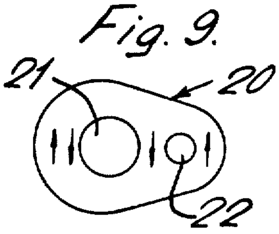
Figure 11:
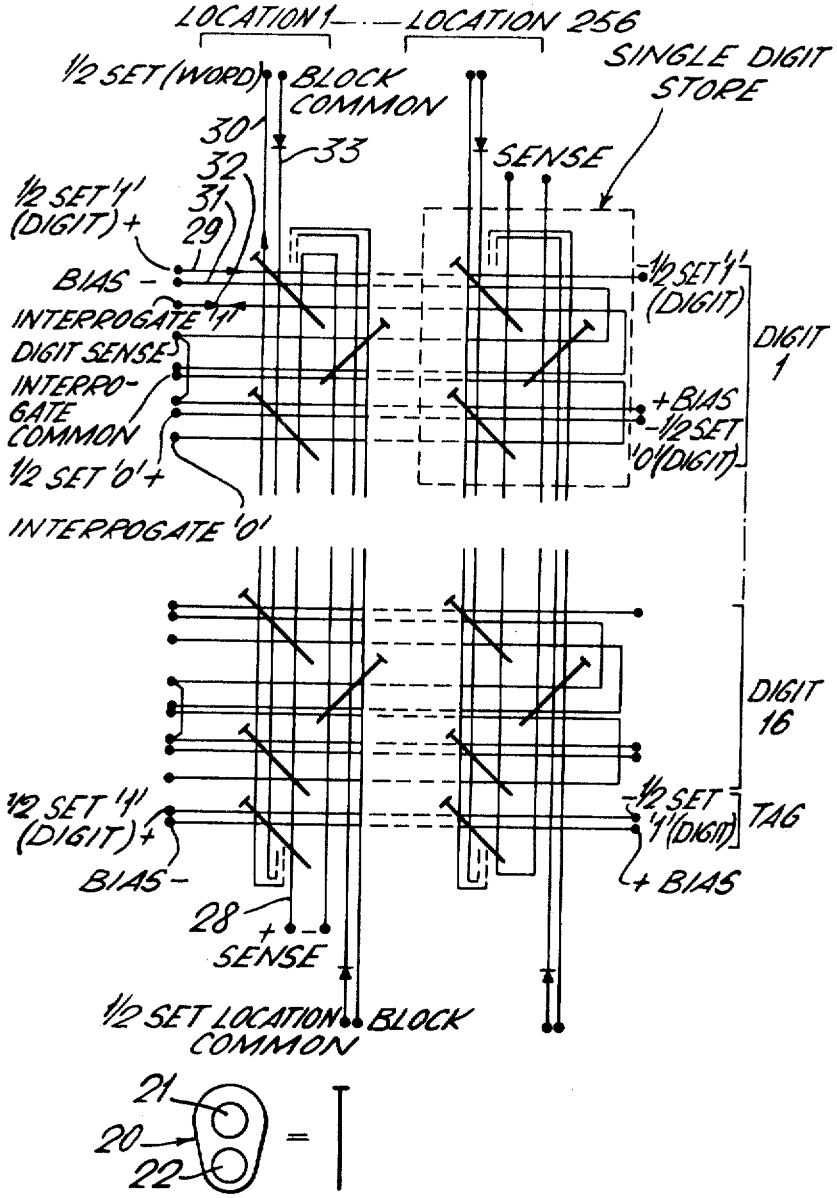
Figure 12A:
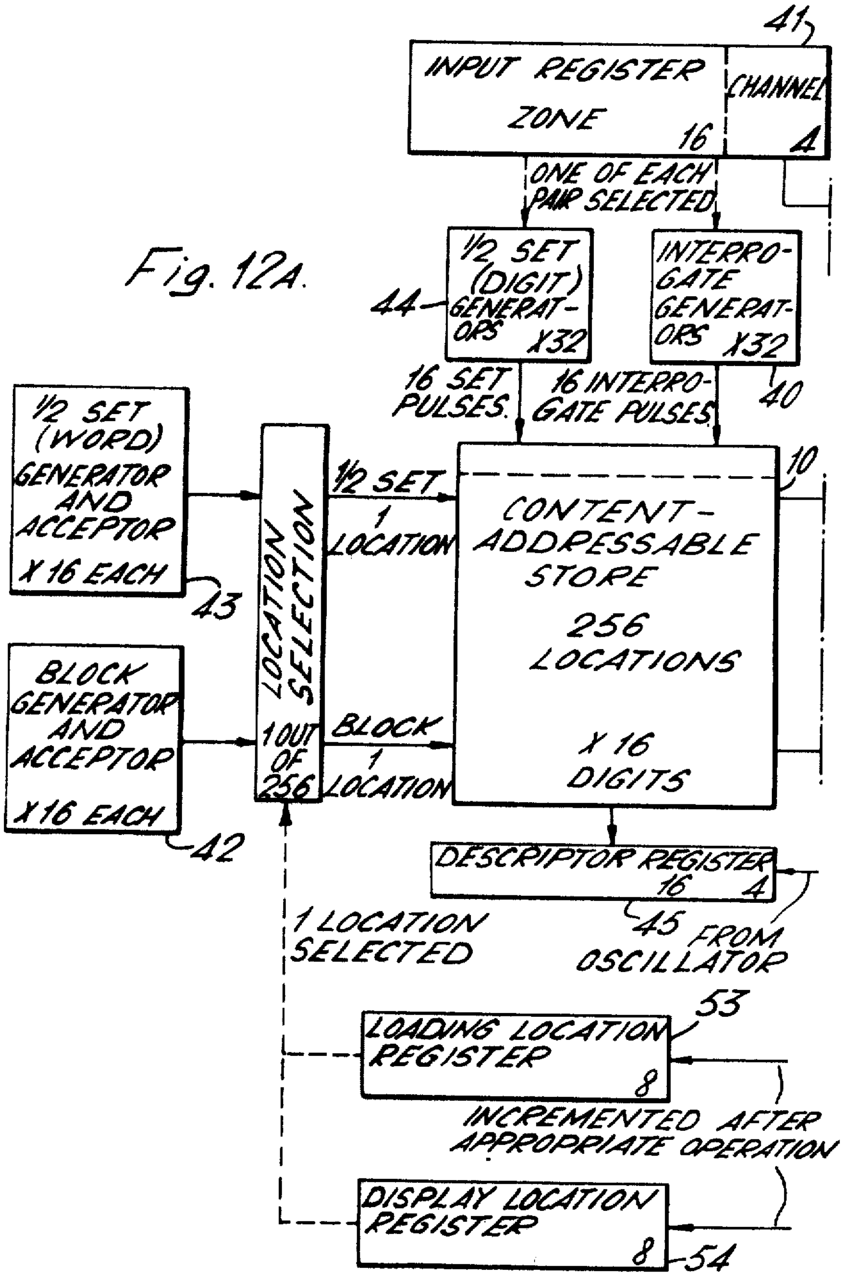
Figure 12B:
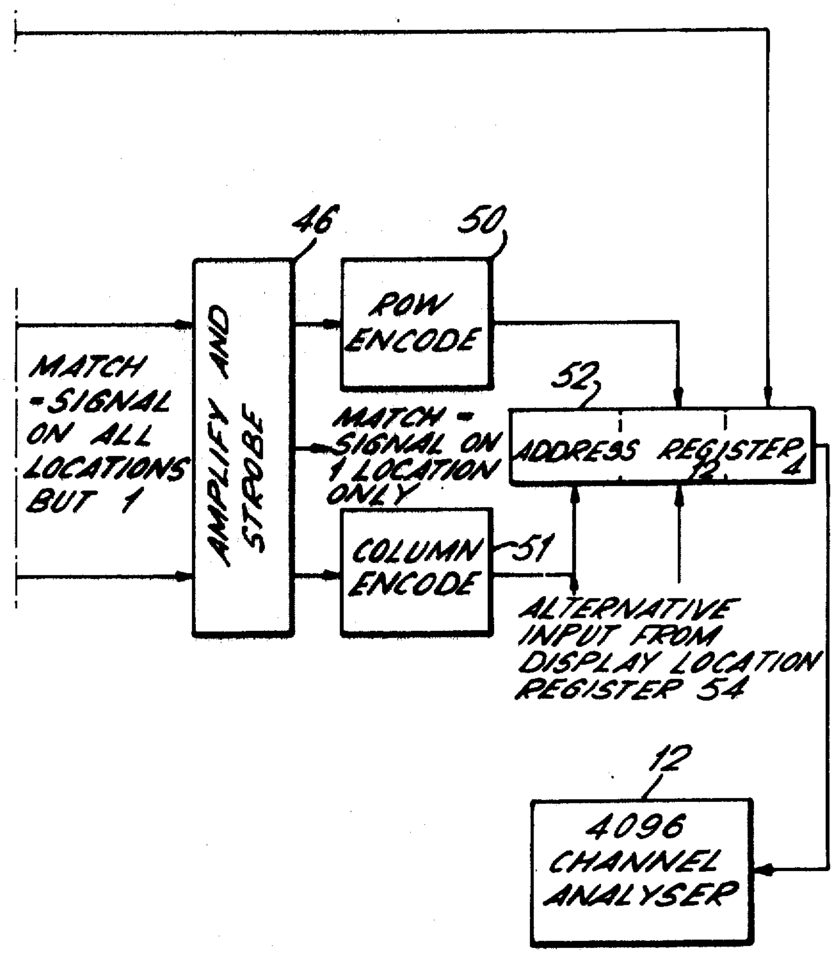
Figure 13:
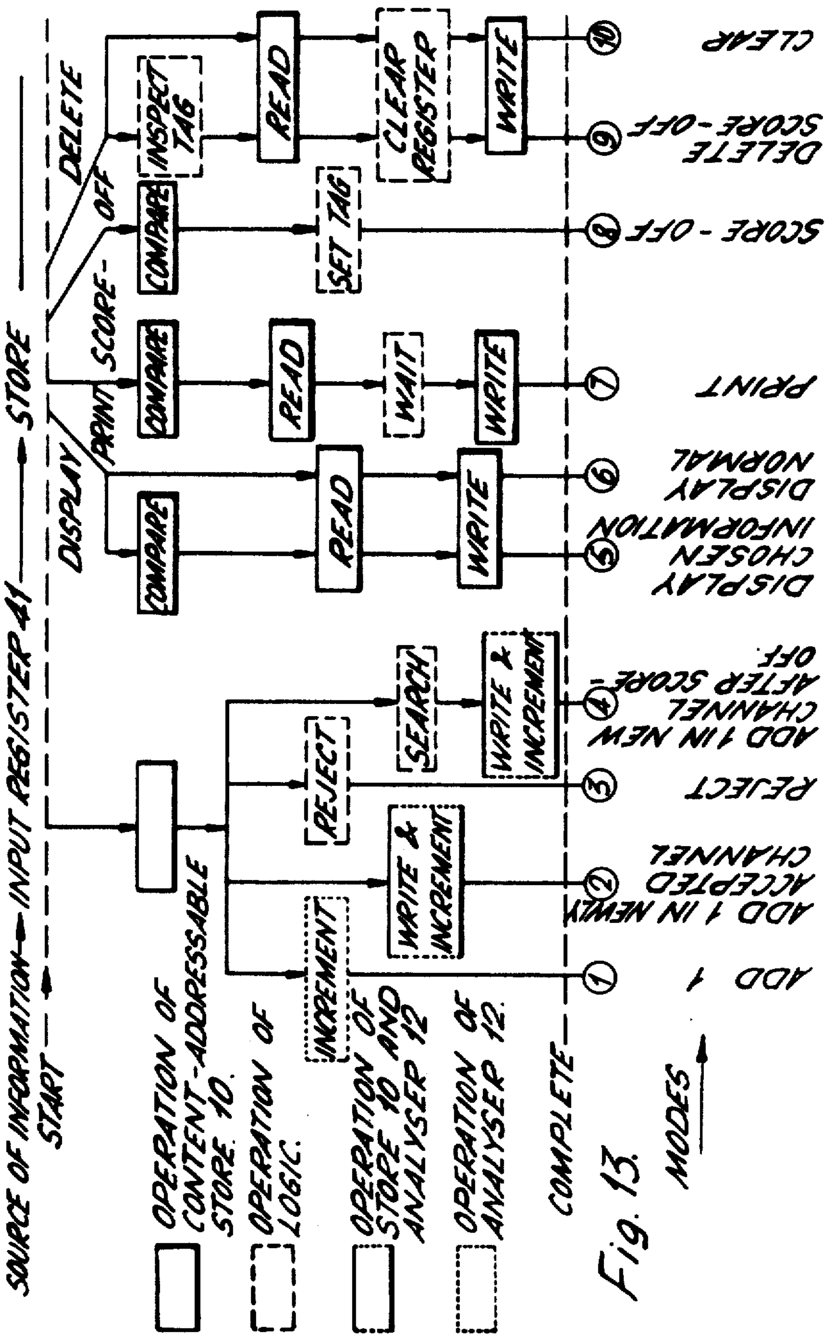
Figure 14:
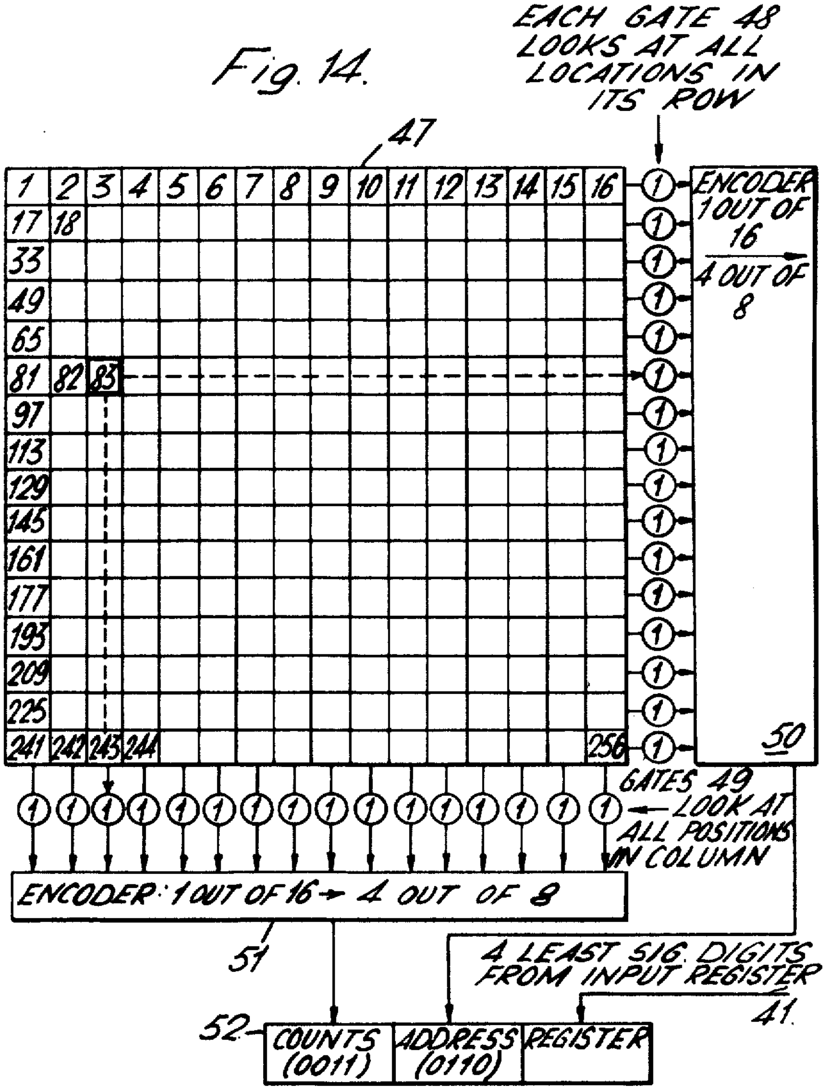

Two binary-information analysing arrangements together with some possible modified versions of the arrangements, all in accordance with the present invention, will now be described by way of example with reference to the accompanying drawings in which:

FIGURE 1 shows the first arrangement in block schematic form,

FIGURE 2 shows a modified version of the first arrangement in block schematic form, FIGURE 3 shows the second arrangement in block schematic form, FIGURE 4 shows a modified version of the second arrangement in block schematic form, FIGURES 5 to 10 show a part of the first or second arrangement in detail, FIGURE 11 shows another part of the first or second arrangement in more detail, FIGURES 12A and 12B shows the second arrangement in more detailed block schematic form, FIGURE 13 illustrates the operation of part of the second arrangement, and FIGURE 14 illustrates the encoding process of part of the second arrangement.

The arrangements will be described as being used in association with nuclear physics experiments of the kind referred to above, although the invention may be used in other fields where similar problems of binary-information analysis arise.

In the case of each arrangement it will be assumed that there are $2^{20}-1$ (that is 1,048,575) different possible events and that each channel descriptor is therefore formed by 20 binary digits. Each of the arrangements to be described thus takes the place of a "conventional" multi-channel analyser which would require to have $2^{20}-1$ channels.

That this is possible results from two facts. Firstly; although $2^{20}-1$ different events are possible, only a fraction will actually occur in any given experiment. However, it is not known in advance which events these will be. Secondly; of the events which do occur it is those which occur most frequently which are, in general, of most interest. Again, however, it is not known in advance which events these will be. (There is also a third fact which is of relevance to the second arrangement and will be mentioned in the description of that arrangement.)

Referring now to FIGURE 1, the first arrangement comprises a content-addressable store 1 having 256 storage locations 2, each of which can store a 20 binary digit channel descriptor, and a 256 channel analyser 3. The channel descriptors are generally designated X and the first 256 different incoming channel descriptors to arrive are designated $X_1, X_2 \ldots X_{256}$. Each time a channel-descriptor is routed into a storage location 2 and outgoing 8 binary digit word representing that storage locations 2 is supplied over a common link to the analyser 3.

The operation is then as follows. On the arrival of $X_1$ it is routed into the first storage location 2 and an outgoing word is supplied to the analyser 3 causing it to register a count of one in the channel coresponding to that storage location 2. If the next channel descriptor to arrive is $X_2$ it is compared with $X_1$ already stored and being found different is routed into the second storage location 2, and an outgoing word is supplied to the analyser 3 causing it to register a count of one in the channel corresponding to the second storage location 2. Similar operations are performed on the arrival of the channel descriptors $X_3$ to $X_{256}$, that is until all 256 storage locations 2 are occupied.

When the comparison of an incoming channel descriptor with channel descriptors already stored shows that the incoming channel descriptor, $X_x$ say, is already stored in the $x$th storage location 2, the incoming channel descriptor is routed to that same storage location 2 with the result that the analyser 3 registers a further count in the channel corresponding to the $x$th storage location 2.

It will be understood that the arrangement neglects all channel descriptors other than $X_1$ to $X_{256}$ but that the statistical probability of the, say 150, most frequently occurring channel descriptors being present in $X_1$ to $X_{256}$ is high. Neglected channel descriptors may, if desired, be "dumped" into another store 4 such as a magnetic tape. It is then possible subsequently to read the dump store 4 back to the arrangement so that a further 256 channel descriptors, including the say 150 next most frequently occurring, are analysed. As the dump store 4 will not have recorded the 256 channel descriptors first analysed then assuming for example that the distribution of channel descriptors falls approximately exponentially from the most frequently occurring, the saving in storage as compared with that used when all incoming channel descriptors are recorded is very considerable. If on reading the dump store 4 back channel descriptors still neglected are "dumped" back into another dump store the process can be repeated as often as desired.

As the 256 channel descriptors first analysed are not passed on, then it is also possible to pass the channel descriptors which the arrangement neglects directly to a second similar arrangement for immediate analysis of the next most frequently occurring channel descriptors.

If necessary the channel descriptors may be preselected prior to being supplied to the store 1. For example, if it is known that certain channel descriptors will occur frequently but it is not required to register these channel descriptors, then they can be arranged to be rejected by a preselector 5 prior to the store 1. Alternatively they can be rejected within the store 1.

The "dead time" of the arrangement is the time taken for the comparison between incoming channel descriptors and the contents of the store 1.

In a particular embodiment each storage location 2 in the store 1 comprises 20 single digit stores each comprising magnetic cores of the type known as transfluxors. Further details of transfluxors will be found below in the more detailed description of the second arrangement, and in Proc. Inst. Radio Engrs., vol. 44, No. 3, pp. 321–332. It is not, of course, essential that the store 1 be of this form, other known storage means such as thin film stores being quite suitable.

The analyser 3 is not an essential feature of the invention, as the outgoing words from the store 1 may be supplied to some other form of accumulating store or other storage or computing means of known form. For example, the arrangement can be modified to avoid the use of any form of accumulating store such as the multichannel analyser 3. Such a modified arrangement is shown in FIGURE 2, to which reference is now made. So far as possible the same reference numerals are used in FIGURE 2 as in FIGURE 1. In this arrangement each time a channel descriptor is routed into a storage location 2 an outgoing signal, which may conveniently be a single pulse, is supplied over an individual line to a pulse counter 6, there being one such counter 6 associated with each storage location 2.

Referring also to FIGURE 1, conventional methods of display, readout, insertion and deletion of chosen information can be used with the first arrangement and with the modified first arrangement. For example, provision can be made to delete very low counts from the analyser 3 (or counters 6) at intervals and, at the same time, to delete the corresponding channel descriptors from the store 1.

The second arrangement will now be described. This arrangement is in fact a modification of the first and, in the particular example to be described, is such as to increase the number of acceptable channel descriptors from 256 to 4096. The 4096 channel descriptors fall into 256 groups of 16, each group of 16 consisting of a sequence of 16 numbers and hereinafter being referred to as a zone. (The events occurring in nuclear physics experiments and other applications tend to be grouped, this being the third fact referred to above.) The operation is such that it does not matter whether the zones themselves are wholly or partly sequential, or not sequential.

Referring now to FIGURE 3, the second arrangement comprises a content-addressable store 10 having 256 storage locations 11, each of which can store 16 digits of a 20 binary digit channel descriptor, and a 4096 channel analyser 12.

The operation is generally similar to that of the first arrangement except that on the arrival of $X_1$ it is routed into the first storage location 11 but only the 16 most significant binary digits (designated $x_1$ and referred to hereinafter as the zone descriptor $x_1$) are stored there. Furthermore the outgoing word supplied over a common link to the analyser 12 is in this arrangement a 12 binary digit word consisting of 8 digits representing the first storage location 11 plus the 4 least significant digits of $X_1$.

The routing of a zone descriptor into any given storage location 11 may therefore result in a count of one being registered in any one of a group of 16 sequential channels in the analyser 12 in dependence on the values of the 4 least significant digits of the incoming channel descriptor. On the arrival of the next incoming channel descriptor $X_2$ (it being assumed, it will be noted, that the second incoming channel descriptor differs from $X_1$), the zone descriptor is compared with the zone descriptor ($x_1$) of $X_1$ stored in the first storage location 11 and, assuming it is not identical, the zone descriptor $x_2$ is routed into the second storage location 11 and stored. The outgoing word supplied to the analyser 12 then consists of 8 digits representing the second storage location 11 plus the 4 least significant digits of $X_2$.

Assuming that the next incoming channel descriptor is $X_3$, and that $X_3$ has the same zone descriptor as $X_1$ then it is routed to the first storage location 11. The outgoing word supplied to the analyser 12 then consists of 8 digits representing the first storage location 11 plus the 4 least significant digits of $X_3$ which (by definition) must be different from the 4 least significant digits of $X_1$. The analyser 12 therefore registers a count of one in a different channel from that where the count due to $X_1$ was registered but in one of the same group of 16 channels. In other words each zone descriptor controls a group of 16 of the 4096 channels in the analyser 12.

If the next incoming channel descriptor is a repeat of one already received, $X_2$ say, then it will be routed to the second storage location 11 where the zone descriptor ($x_2$) is already stored. The outgoing word supplied to the analyser 12 is in this case a repeat of that supplied on the first occurrence of $X_2$ and a second count is registered in the appropriate channel of the analyser 12.

The operation continues in this way until all 256 storage locations 11 are occupied.

As in the case of the first arrangement a dump store 13 and/or a preselector 14 or internal rejection may be provided. Also the neglected channel descriptors may in the same way be passed directly to a second similar arrangement for immediate analysis of the next most frequently occurring channel descriptors.

Also as before, the analyser 12 is not an essential feature of the invention, as the outgoing words from the store 1 may be supplied to some other form of accumulating store or other storage or computing means of known form. Such a modified arrangement is shown in FIGURE 4, to which reference is now made. So far as possible the same reference numerals are used in FIGURE 4 as in FIGURE 3. In this arrangement each storage location 11 is provided with an individual link to an associated 16 channel analyser 15. Each time a zone descriptor is routed into a storage location 11 the 4 least significant digits of the channel descriptor are supplied over the link to the associated analyser 15.

In most cases this is unlikely to be a simpler arrangement than using a single multichannel analyser, but there may be cases in which this modified arrangement is preferred.

Referring also to FIGURE 3, conventional methods of display, readout, insertion and deletion of chosen information can be used with the second arrangement and with the modified second arrangement. For example, provision can be made to delete very low counts from the analyser 12 (or the analysers 15) at intervals and, at the same time, to delete the corresponding zone descriptors from the store 10.

The general configuration and operation of various arrangements having been described, some more detailed description will now be given of a particular embodiment of the second arrangement shown in FIGURE 3, to which reference is again made.

The main components of the arrangement are the content-addressable store 10 which comprises the storage locations 11, the peripheral logic section necessary to control it, and the analyser 12 which is of known form and will not be described further. The more detailed description will first be confined to the storage locations 11 and in particular the way in which transfluxors are used to form the single digit stores.

Figure 5:
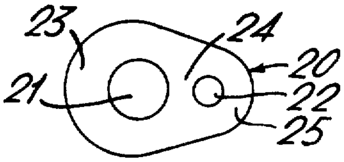

A transfluxor 20 is shown diagrammatically in FIGURE 5, to which reference is now made. The transfluxor 20 is made from the same type of ferrite material as a simple magnetic core, but has major and minor apertures 21 and 22, respectively. The geometry of the transfluxor 20 is such that two magnetic flux paths exist, one around the aperture 21 only, the other around both apertures 21 and 22. The cross-sections of the three limbs 23, 24 and 25 are such that those of limbs 24 and 25 together are less than that of limb 23, so that the total flux through limbs 24 and 25 can pass through limb 23.

Figure 6:
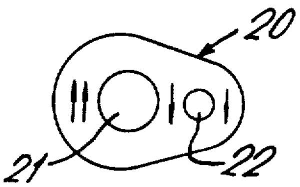

Initially the transfluxor 20 is "blocked" by a current pulse passing through the aperture 21 sufficient to saturate both flux paths and produce the state shown in FIGURE 6. Subsequent operation depends on the fact that a current pulse passed through the aperture 21 or 22 affects the flux condition near the relevant aperture 21 or 22, without altering that further away.

The "set" pulse also passes through the aperture 21 but is of smaller magnitude than, and in the opposite direction to, the "block" pulse. The set pulse affects only the smaller of the two flux loops, and produces the state shown in FIGURE 7. In the simple use of the transfluxor the blocked condition (FIGURE 6) represents binary 0 and the set condition (FIGURE 7) represents binary 1.

Figure 8:
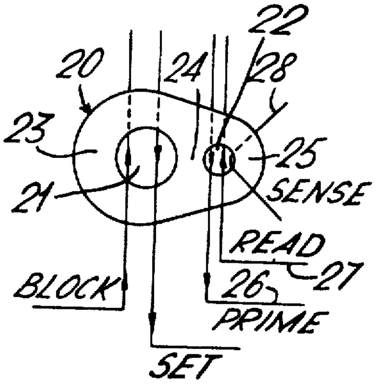
Figure 7:
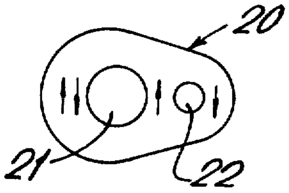

Referring now to FIGURE 8, the minor aperture 22 carries three wires 26, 27 and 28 for "prime," "read" and "sense" pulses. The prime pulse is such as to affect limbs 24 and 25, but not limb 23. The read pulse is of similar magnitude but opposite direction. These pulses always follow one another and together form an interrogate signal. When the transfluxor 20 is in the blocked condition neither prime nor read pulse can have any effect on the flux state round the aperture 22. When however the transfluxor 20 is in the set condition the flux directions in limbs 24 and 25 are not the same and the aperture 22 can act like a simple core saturated in one direction, and switch the flux loop from clockwise to anti-clockwise. The prime pulse thus produces the condition shown in FIGURE 9, and the change of flux round the aperture 22 gives a large pulse on the sense wire 28. The read pulse then switches the aperture 22 back to its initial set condition. As the information held by the transfluxor 20 is denoted by the state of limb 23, this can be repeated indefinitely without regeneration.

In the content-addressable store 10 (FIGURE 3) there is, in addition to the usual read and write requirements, a requirement for a comparison operation in which a zone descriptor is compared with the store contents. Thus in addition to responses indicating binary 0 and 1, there must be distinct responses from the digit stores indicating "match" and "mismatch," and these latter must be independent of the binary state. To achieve this two transfluxors are used for each digit store. Binary 0 is represented by one transfluxor being in the set condition while the other is in the blocked condition, and the binary 1 by the reverse condition. The two transfluxors will be referred to as the 0 transfluxor (that which is set for the 0 condition and blocked for the 1 condition) and the 1 transfluxor (set for the 1 condition and blocked for the 0 condition) respectively. In making a comparison, the interrogation signal is applied to only one transfluxor of a pair. The transfluxor to be interrogated is selected by the appropriate digit in an input register. For reasons discussed below, a binary 0 in a given position in the input register causes interrogation of the transfluxor of the corresponding digit which is set when binary 1 is stored, and vice versa. In this way the opposite state existing in any word, which represents a mismatch, causes the interrogated transfluxor to give an output signal. Thus an output signal represents a mismatch and no output signal represents a match.

Unfortunately on interrogating a transfluxor in the blocked condition a noise signal is produced. This is unacceptable and to avoid it a third transfluxor is added to the digit store. This transfluxor, which is referred to as the dummy transfluxor, is connected so that it is always in the blocked condition. The sense wires which detect the signal caused by the switching of either of the 0 or 1 transfluxors both pass through the minor aperture (aperture 22 in FIGURE 5) of the dummy transfluxor. When the digit store is interrogated the prime and read pulses pass through either the 0 or 1 transfluxor. The direction of the wiring is so arranged that the dummy transfluxor, which always produces a noise signal, does so in the opposite sense to the other transfluxor in the blocked condition so that the two noise signals tend to cancel.

There is a further difficulty that an interrogation signal acts to some extent as a set pulse on a blocked transfluxor. To overcome this effect the major aperture (aperture 21 in FIGURE 5) is continuously subjected to a small bias current which must be overcome before the transfluxor can be set.

Referring now to FIGURES 10 and 11, these show the actual wiring of a 0 or 1 transfluxor 20, and the wiring of the transfluxor plane, respectively. Blocking requires a pulse on wire 33. To set then requires pulses on wires 29 and 30 to give coincident current setting of single positions in the plane. Wire 31 carries the bias current to avoid spurious setting, and a single wire 32 is used for the prime and read pulses which are essentially the two parts of a single interrogation signal.

FIGURES 12 and 12B, to which reference is now made, shows the content-addressable store 10, the logic section and the analyser 12 in detailed block schematic form with sufficient legends to make clear a large part of the working. The store 10 has three operations: Compare, write and read. Taken with operations of the logic section and the analyser 12 it is possible to form a number of alternative sequences of operations, referred to hereinafter as "modes." Each mode represents a sequence of operations to deal with a single piece of information. These modes are set out in FIGURE 13 in which each block represents an operation. Each route from the "start" line to the "complete" line represents a sequence of operations constituting a mode, the modes being identified at the bottom.

The basic operation is compare, in which a zone descriptor is presented for comparison, in a single parallel operation, with all the zone descriptors already held in the 256 storage locations. Referring also to FIGURES 10 and 11, individual interrogate wires 32 thread corresponding transfluxors for all storage locations. There are 32 wires 32, one pair for each digit of the zone descriptor. The pulse generators 40 driving these wires 32 are so arranged that only one of a pair is pulsed in an operation. The state of the relevant digit of the input register 41 which is holding the channel descriptor determines which this is to be, selecting the 0 common wire 32 if the input digit is binary 1, and the 1 common wire 32 if the input digit is binary 0. The 16 selected wires 32 receive interrogate signals. Whenever these signals interrogate a transfluxor in the set condition a sense pulse appears on the sense wire 28 linking all digit stores in that storage location. Such a signal indicates a mismatch, as the interrogated transfluxor indicates the opposite condition to that corresponding to the relevant digit in the input register 41. The number of mismatch signals appearing in any one sense line 28 at an interrogation may vary from 16, when no digits are in agreement, to zero, when in the match condition. As the transfluxors in each storage location are interrogated in parallel the amplitude of the signal observed is dependent on the number of digits failing to match. The worst case, giving the lowest signal to noise ratio, is where only one digit of the interrogated storage location differs from the input zone descriptor.

In this worst case there is only one transfluxor mismatched and giving a signal, while the other 15 transfluxors interrogated in that storage location are contributing noise. Nevertheless, due to the dummy transfluxors, the signal to noise ratio is satisfactory.

The result of the compare operation is to produce a mismatch signal on all lines where there is not a match with the zone discriptor in the input register 41. As no zone descriptor can appear in more than one storage location, this means that in any compare operation either all lines have such a signal, indicating that that zone descriptor is not held, or all lines but one have a mismatch, leaving one line, with no signal, giving the storage location at which the zone descriptor is already stored. (All storage locations which are vacant are set to all binary 0's, so that this zone descriptor is not allowable.)

The write-in operation occurs in a number of modes. The zone descriptor to be written in is normally held in the input register 41 and a coincident current method is used to write it in to a storage location. The selected storage location is first blocked by a block pulse from a generator 42, all the transfluxors being blocked whether 0 or 1. The half of the required set pulse shown in FIGURE 10 as ½ set (word) flows only along the wire 29 which threads all 0 and 1 transfluxors in the selected storage location. The ½ set (word) pulse is supplied by a generator 43. A similar pulse flows in the ½ set (digit) wires 30 selected by the zone descriptor being written in. The ½ set (digit) pulse is supplied by a generator 44. Setting takes place only where both halves of the set current are present. This happens only at the appropriate positions in the selected storage location, which is thus set to contain the zone descriptor. The way in which the storage location is selected is described below.

The third operation is to read out the contents of a selected storage location into a descriptor register 45. As with the write operation there will have been a previous selection process determining which storage location is to be read out. To read out, the apertures 21 of the 1 transfluxors for each digit of the selected storage location are interrogated like simple cores. When a set transfluxor is blocked or vice-versa, there is a large flux change around the aperture 21 and a large signal is induced on the sense wire 28. The signal required to do this is supplied over the bias wire 31, which normally carries a small steady current. The wire 31 is connected through all three transfluxors of corresponding digits of all the storage locations. It traverses the length of the store three times, passing down through all of the 1 transfluxors, back through the dummy transfluxors and down again through the 0 transfluxors. To read, the wire 31 is connected to the descriptor register 45 into which the zone descriptor is to be written, at the point where it loops back for the third section through the 0 transfluxors. For this purpose it is terminated so that signals on it are due only to flux changes in the 1 transfluxors. The read operation comprises blocking the selected storage location. Where there are digits set to binary 1, the 1 transfluxors switch and induce signals to set up the corresponding digits of the descriptor register 45. The selected storage location is left completely blocked and the same word can be written back by a write operation as before.

Referring now to FIGURES 12A, 12B and 13, the logic section works on a clocked basis, with a cycle time of a few microseconds. Any particular mode requires a number of cycles, normally 1 or 2.

There are 10 possible modes which fall into two groups. The first group deals with new binary information entering the input register 41. They are:

(1) Add 1.
(2) Write and add 1.
(3) Reject.
(4) Write and add 1 (score-off).

The second group deals with information already held in the store 10 or analyser 12, allowing manipulation for display, print and selection purposes. They are:

(5) Display selected information.
(6) Normal display.
(7) Print.
(8) Score-off.
(9) Delete after score-off.
(10) Clear.

These various modes will be dealt with in turn.

The first operation in modes (1) to (4) is a compare operation which shows whether the zone descriptor present in the input register 41 is held in the store 10, and if so at which location. Following this operation one of four modes is possible. The simplest case is mode (1), where a match is obtained, and it is only required to add 1 in the appropriate channel in the analyser 12. The compare operation of the store 10 results, for a match, in a signal on the sense wire 28 (FIGURES 10 and 11) of all but the matching storage location. Each wire 28 (FIGURES 10 and 11) passes to a strobed amplifier 46. The small mismatch signal is amplified, and stretched to overcome the variation in the time delay between the interrogate signal and the sensed response. A strobe signal is then applied to all the wires 28 (FIGURES 10 and 11) and is cancelled in all cases where a mismatch signal occurs. On the single matched wire 28 (FIGURES 10 and 11) the strobe signal appears as an output. Thus only one of the strobed amplifiers 46 has an output and this indicates a match on one of 256 wires 28 (FIGURES 10 and 11).

This signal is encoded to give an 8 binary digit number identifying the matched storage location. Referring now to FIGURES 12A, 12B and 14, the 256 sense wires 28 are arranged in a matrix 47 of 16 x 16. Each row, and each column, of the matrix 47 is connected to its own 16 input OR gate 48 or 49 respectively. Since only 1 wire 28 in each row and column carries the match signal, this wire 28 is indentified by outputs from one gate 48 and one gate 49 only. Row and column coders 50 and 51 respectively give 4 binary digit signals identifying the row and column, so that the zone descriptor is identified by an 8 binary digit number. This number is set into the 8 most significant digit stores of an address register 52, which selects a group of 16 locations in the analyser 12. The last 4 binary digits in the input register 41 are used to complete a 12 binary digit address, selecting a specific channel within the group. The add one operation completes this mode.

If no match response is obtained from the compare operation, three possibilities exist, giving modes (2), (3) and (4). In all cases the input zone descriptor presented is not held in the store 10. There are then two possibilities, either the store 10 is already full, so that the new zone descriptor must be rejected, or a vacant storage location exists into which the zone descriptor must be written.

In the reject mode (3) the zone descriptor cannot be accepted, and a reject signal is provided. This may be used either as a reject count, or to initiate an alternative way of storing the channel descriptor, such as writing into a dump store.

If the store 10 is not full the new zone descriptor must be written in to the next vacant storage location. There are two ways of doing this, and in both cases a storage location is selected by a loading location register 53. The selection of a storage location, whether to be blocked as in the read operation, or set, as in the write operation, is done in a similar manner to the inverse process of encoding a matched word described above with reference to FIGURE 13. Referring again to FIGURE 11, the 256 storage locations are arranged in a matrix of 16 x 16. Each row of the matrix is driven by a common drive circuit, block or ½ (word). Each column is connected to a common acceptor circuit. Before the signal can affect one storage location a single driver and a single acceptor must be energised. These select a row, and a column, and thus a unique storage location in the matrix. Row and column are each chosen by a 4 binary digit code, and the combination is the 8 binary digit code for the chosen storage location.

In writing in a new zone descriptor into an available storage location a difficulty arises because of the provision of a score-off facility, which allows selected zone descriptors to be deleted to avoid wasting storage locations on channels which may be active but are not of immediate interest. At the end of each write operation the loading location register 53 is incremented, so that it always contains the number of the next available storage location. When another new zone descriptor appears it is allocated to the storage location indicated by the loading location register 53, by the sequence of operations in mode (2). At the same time the analyser 12 is incremented appropriately. The two operations of writing in the store 10, and adding one in the analyser 12 take place in parallel in the same clock period. After score-off has taken place, certain zone descriptors being deleted from the store 10, the empty storage locations will no longer be in a set order. To overcome this, clearing is followed by a search operation. The contents of the store 10 are read sequentially into the descriptor register 45. This has a gate connected so as to recognise the all 0 condition. If the number read is not 0, it is written back to the same storage location, and the loading location register 53 is incremented. The process is repeated until a vacant storage location is identified, when the search is complete, and the loading location register 53 again contains the code of the next vacant storage location. After each new zone descriptor is accepted, the search carries on to the next vacancy. The time required for each repetition of this mode depends upon the number of storage locations cleared in the score-off. All storage locations have to be searched and a cycle of operation is needed for each.

In practice it is unlikely that the binary information will arrive at a rate sufficient to keep the arrangement fully occupied. The normal display mode (6) takes advantage of this. As the various parts of the arrangement are linked, a continuous live display of newly received binary information is generated in parallel with the normal acceptance modes. Therefore when no new binary information is available at a timing pulse the display mode (6) is automatically selected. The display is an external unit for which the arrangement provides control signals. When a display mode (6) starts, the contents of a storage location in the store 10 as selected by the display location register 54 are read into the descriptor register 45. This is a 16 binary digit number. The last 4 digits of the descriptor register 45 form a separate counting register, completing the 20 binary digit channel descriptor. This channel descriptor and the associated count from the analyser 12 provide the display data. The analyser 12 is addressed by a 12 binary digit number made of up 8 binary digits from the display location register 54, and the 4 least significant binary digits from the descriptor register 45. This enables a single point to be displayed. At the end of the cycle, the zone descriptor is written back into the storage location, and the 4 binary digit section of the descriptor register 45 is incremented. If there is still no new binary information, the mode (6) repeats, displaying the contents of the next channel in the group. This continues until the 16 channels of the group have been displayed, when the display location register 54 is incremented and moved onto the next group in the store 10. The display mode (6) is always halted to allow new information to be accepted.

In an alternative form of display, channel descriptors are provided from the display unit itself to interrogate the store 10. In this case the input register 41 is set to a channel descriptor from this source, and the first operation is a compare cycle. If the appropriate zone descriptor is held at a particular storage location the contents of that storage location are read into the descriptor register 42, the 20 binary digit descriptor being completed in this instance by the 4 least significant binary digits from the input register 41. The encoded channel address is used to interrogate the analyser 12 as before.

In the normal display mode (6), groups of 16 channels are examined in the order in which they occur in the store 10. For print out purposes it is more useful to have the information in numerical order of channel descriptors. The input register 41 is counted forward by an oscillator and a comparison carried out for each channel descriptor. All possible channel descriptors are generated in turn, in numerical order. When a match is found the counts are read out from the analyser 12, and the channel descriptor and associated counts printed or punched. This is essentially a slow process, but the time taken to generate all possible channel descriptors is small compared to the time to print out the 4,096 data channels.

The score-off mode (8) operates on a "tag" transfluxor (FIGURE 11) which forms a seventeenth digit store in each storage location. This facility enables unwanted zone descriptors to be deleted. In the first operation the unwanted zone descriptor is compared with those held, and the tag transfluxor set on the appropriate storage location. This allows a certain margin of error before clearing the storage locations, and destroying the binary information. The unwanted zone descriptors may be selected by determining the groups of channels having below a predetermined count stored in the analyser 12.

The actual clearing mode has two variations, delete (9) and clear (10). When score-off words are to be deleted the store 10 is examined sequentially. Where the tag transfluxor is set, indicating that the storage location is to be cleared, the zone descriptor is read into the descriptor register 45, which is then cleared. Zero is read back into the storage location, and the tag transfluxor blocked. Where a complete clearance is required, the same sequence is used, except that all storage locations are read out and cleared, regardless of the setting of the tag transfluxor.

We claim:

1. A binary-information analysing arrangement for analysing incoming binary digital words each formed by an equal plurality of binary digits comprising a binary store having a plurality of storage locations each able to store one incoming word, the number of storage locatins being less than the total possible number of different incoming words, means for comparing each incoming word with the word in each storage location and for producing a signal characteristic of the location if a match is obtained, means for writing the word into a vacant storage location and for producing a signal characteristic of that location if a match is not obtained, means for rejecting the word if all storage locations are filled, and counter means associated with each storage location for registering a count each time an incoming word is routed into that storage location.

2. A binary-information analysing arrangement for analysing incoming binary digital words each formed by an equal plurality of binary digits comprising a binary store having a plurality of storage locations each able to store one incoming word, the number of storage locations being less than the total possible number of different incoming words, means for comparing each incoming word with the word in each storage location and for producing a signal characteristic of the location if a match is obtained, means for writing the word into a vacant storage location and for producing a signal characteristic of that location if a match is not obtained, means for rejecting the word if all storage locations are filled, and means associated with each storage location for supplying an outgoing binary digital word identifying the storage location each time an incoming word is routed into that storage location.

3. An arrangement in accordance with claim 2 further comprising an accumulating store to which said outgoing words are supplied.

4. An arrangement in accordance with claim 2 further comprising a multichannel analyser to which said outgoing words are supplied, said analyser having as many channels as there are storage locations in the binary store.

5. A binary-information analysing arrangement for analysing incoming binary digital words, each of which is formed by a plurality N of binary digits, comprising a binary store having a plurality of storage locations each able to store a plurality $n$ of binary digits where $n$ is less than N, means for comparing the $n$ most significant binary digits of each incoming word with the $n$ binary digits of the word in each storage location and for producing a signal characteristic of the location of a match is obtained, means for writing a word not having the $n$ most significant binary digits identical with the $n$ binary digits stored in any location into a vacant storage location and for producing a signal characteristic of that location, means for rejecting the word if all storage locations are filled, and means associated with each storage location for supplying an outgoing binary digital word each time an incoming word is routed into that storage location, each outgoing word comprising the $N-n$ least significant binary digits of the incoming word then being routed into that storage location.

6. An arrangement in accordance with claim 5 further comprising a plurality of multichannel analysers equal in number to the number of storage locations and connected one-to-one therewith such that each outgoing word is supplied to the multichannel analyser associated with the relevant storage location, each multichannel analyser having $2^{(N-n)}$ channels.

7. A binary-information analysing arrangement for analysing incoming binary digital words, each of which is formed by a plurality N of binary digits, comprising a binary store having a plurality S of storage locations each able to store a plurality $n$ of binary digits where $n$ is less than N but greater than $\log_2 S$, means for comparing the $n$ most significant binary digits of each incoming word with the $n$ binary digits of the word in each storage location and for producing a signal characteristic of the location if a match is obtained, means for wiring a word not having the $n$ most significant binary digits identical with the $n$ binary digits stored in any location into a vacant storage location, and for producing a signal characteristic of that location, means for rejecting the word if all storage locations are filled, and means associated with each storage location to supply an outgoing binary digital word each time an incoming word is routed into that storage location each outgoing word being formed by a plurality $\log_2 S$ of binary digits identifying the storage location plus $N-n$ least significant binary digits of the incoming word then being routed into that storage location.

8. An arrangement in accordance with claim 7 further comprising a multichannel analyser to which said outgoing words are supplied and which has $2^{(N-n)}$ times as many channels as there are storage locations in the binary store.

9. An arrangement in accordance with claim 7 wherein each said storage location comprises $n$ single digit stores each comprising first and second transfluxors, it being arranged that the first transfluxor in the set condition and the second transfluxor in the blocked condition represents binary 0, and the first transfluxor in the blocked condition and the second transfluxor in the seat condition represents binary 1.

10. An arrangement in accordance with claim 9 wherein each transfluxor comprises a body of ferrite material having a minor and a major aperture therein, and means is provided to read each said storage location by interrogating the major aperture of one transfluxor of each digit store as if it were a simple magnetic core.

11. An arrangement in accordance with claim 9 wherein each said storage location further comprises a third transfluxor arranged to be maintained in the blocked condition, the third transfluxor being so connected that it gives rise to noise signals which tend to cancel noise signals arising from the first or second transfluxor which is in the blocked condition.

12. An arrangement in accordance with claim 7 wherein said binary store comprises a thin film store.

13. An arrangement in accordance with claim 7 further comprising means selectively to reject incoming words that do not have the $n$ most significant binary digits identical with the $n$ binary digits stored in any storage location.

14. An arrangement in accordance with claim 8 further comprising means to delete a selected group of $n$ binary digits from the storage location in which it is stored and to delete the count from the corresponding channel of said analyser.

15. A binary-information analysing arrangement for analysing incoming binary digital words, each of which is formed by 20 binary digits, comprising a binary store having 256 storage locations each able to store 16 binary digits, means for comparing the 16 most significant binary digits of each incoming word with the 16 binary digits stored in each storage location and for producing a signal charasteristic of the location if a match is obtained, means for writing a word not having the 16 most significant binary digits identical with the 16 binary digits stored in any storage location into a vacant storage location and for producing a signal characteristic of the location, means for rejecting the word if all of the storage are filled, means associated with each storage location to supply an outgoing binary digital word each time an incoming word is routed into that storage location each outgoing word being formed by 8 binary digits identifying the storage location plus the 4 least significant binary digits of the incoming word then being routed into that storage location, and a 4096 channel analyser to which the outgoing words are supplied.

References Cited

UNITED STATES PATENTS

| | | | |
|---|---|---|---|
| 2,951,235 | 8/1960 | Welsh | 340—172.5 |
| 3,197,742 | 7/1965 | Rettig et al. | 340—172.5 |
| 3,208,051 | 9/1965 | Tarchini | 340—172.5 |
| 3,267,439 | 8/1966 | Bonner | 340—172.5 |

ROBERT C. BAILEY, *Primary Examiner.*

PAUL A. HENON, *Examiner.*

G. SHAW, *Assistant Examiner.*